(12) United States Patent
Yu

(10) Patent No.: US 7,053,516 B2
(45) Date of Patent: May 30, 2006

(54) BACK COVER HAVING CARBON BRUSH HOLDER FOR MOTOR

(75) Inventor: Meng-Chiu Yu, Taichung (TW)

(73) Assignee: Taiwan Long Hawn Enterprises Co., Taiwan (CN)

( * ) Notice: Subject to any disclaimer, the term of this patent is extended or adjusted under 35 U.S.C. 154(b) by 0 days.

(21) Appl. No.: 10/870,056

(22) Filed: Jun. 18, 2004

(65) Prior Publication Data
US 2004/0263022 A1    Dec. 30, 2004

(30) Foreign Application Priority Data
Jun. 30, 2003    (TW) .............................. 92212051 U

(51) Int. Cl.
H02K 39/38    (2006.01)
(52) U.S. Cl. ......................................... 310/239; 310/89
(58) Field of Classification Search ........ 310/238–248, 310/89
See application file for complete search history.

(56) References Cited

U.S. PATENT DOCUMENTS

| | | | | |
|---|---|---|---|---|
| 4,297,605 A | * | 10/1981 | Tak | 310/242 |
| 6,054,777 A | * | 4/2000 | Soh | 290/38 R |
| 6,394,191 B1 | * | 5/2002 | Nakane | 173/217 |

FOREIGN PATENT DOCUMENTS

TW    273358    3/1996

* cited by examiner

*Primary Examiner*—Thanh Lam
(74) *Attorney, Agent, or Firm*—Browdy and Neimark, PLLC

(57) ABSTRACT

A back cover for a motor includes a shell body, two carbon brush holders and two covering caps. The shell body has two receiving holes cut through inside and outside walls thereof. The carbon brush holders are respectively mounted in the shell body for holding a respective carbon brush bar in the receiving holes. The two carbon brush holders each have a mounting plate located in one of the receiving holes, and a spring supported on the mounting plate for forcing the carbon brush bar toward an inside of the shell body. The covering caps are respectively mounted on the outside wall of the shell body to cover the receiving holes respectively.

11 Claims, 2 Drawing Sheets

BACK COVER HAVING CARBON BRUSH HOLDER FOR MOTOR

BACKGROUND OF THE INVENTION

1. Field of the Invention

The present invention relates to motors and more particularly, to a back cover having carbon brush holders for a motor.

2. Description of the Related Art

A conventional carbon brush holder, for example, Taiwan patent publication No. 273358, is comprised of a plastic holder base, a copper seat, and a covering cap. When in use, two carbon brush holders are fixedly mounted in the housing of the motor and located at two opposite sides of the commutator to hold a respective carbon brush bar in close contact with the commutator, achieving the expected effect. The two carbon brush holders must be separately affixed in the housing of the motor. After installation of the carbon brush holders, a back cover is mounted on the rear side of the housing of the motor and covered over the carbon brush holders inside the housing. When wishing to replace the carbon brush bars after a long use of the motor, it is necessary to detach the back cover at first, and then to dismount the carbon brush holders. This carbon brush holder mounting design is complicated, in consequence, the maintenance work is complicated.

SUMMARY OF THE INVENTION

It is the primary objective of the present invention to provide a back cover for a motor, which has carbon brush holders for installation of the carbon brush bars.

It is another object of the present invention to provide a back cover having carbon brush holders for a motor, which has a simple structure and is easy to install the carbon brush bars therein.

To achieve these objectives of the present invention, the back cover for a motor provided by the present invention comprises a shell body, two carbon brush holders and two covering caps. The shell body includes two receiving holes cut through inner and outer projections thereof. The carbon brush holders are respectively mounted in the shell body for holding a respective carbon brush bar in the receiving holes. The two carbon brush holders each have a mounting plate located in one of the receiving holes, and a spring supported on the mounting plate for forcing the carbon brush bar toward an inside of the shell body. The covering caps are respectively mounted on the outer projections of the shell body to cover the receiving holes respectively.

DETAILED DESCRIPTION OF THE INVENTION

Figure 1:
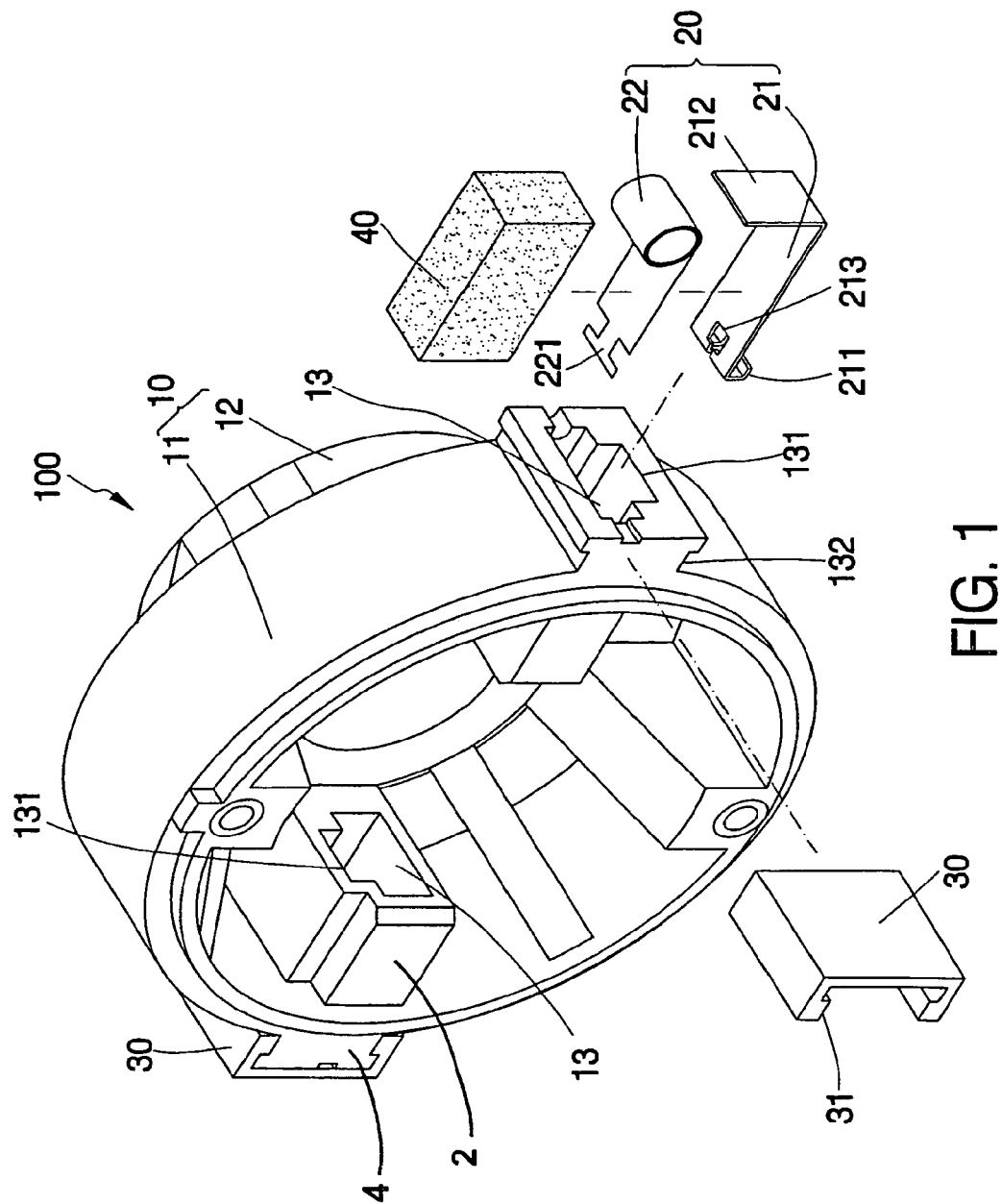
FIG. 1 is an exploded view of a preferred embodiment of the present invention.
Figure 2:
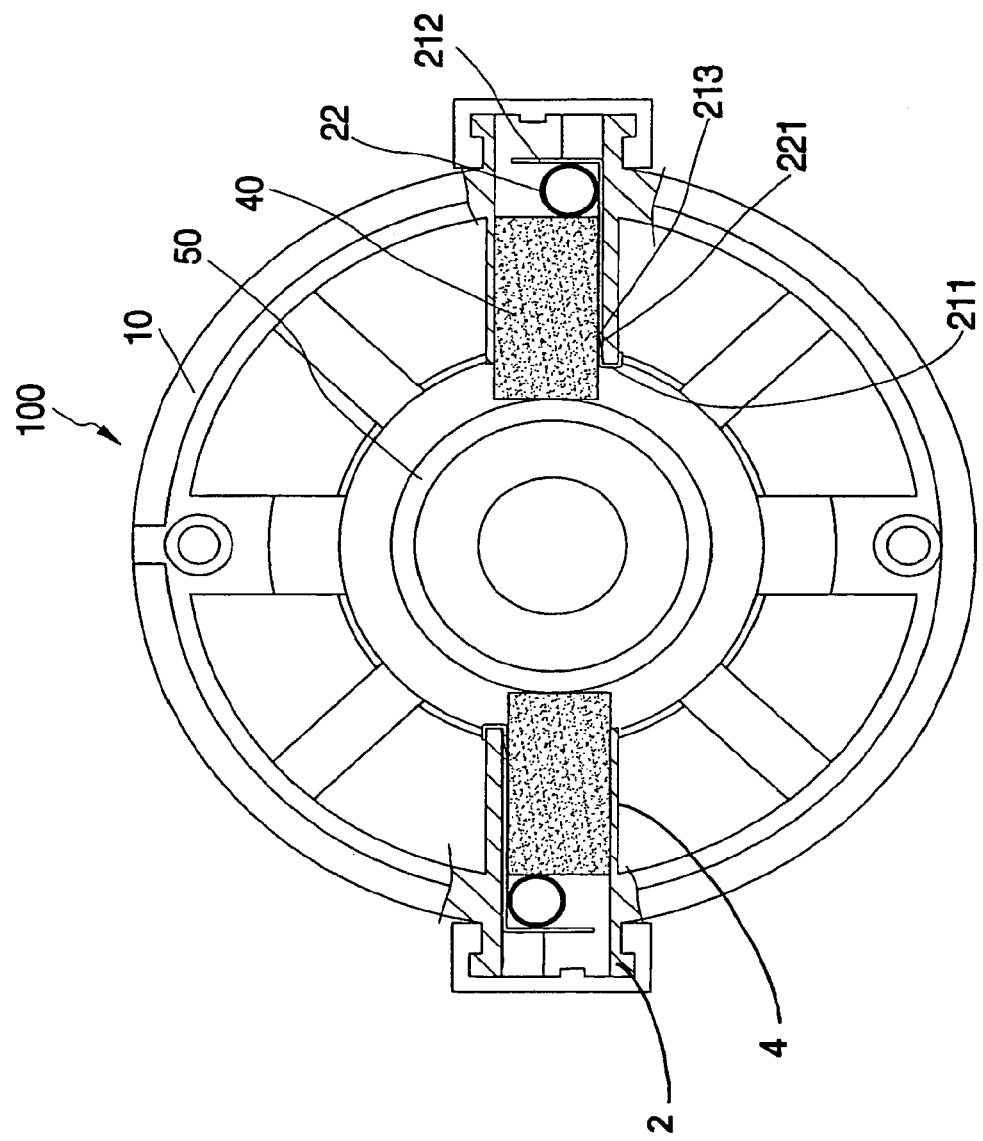
FIG. 2 is a sectional assembly view of the preferred embodiment of the present invention.

Referring to FIGS. 1 and 2, a back cover 100 for mounting on a rear side of a housing of a motor (not shown) is shown comprised of a shell body 10, two carbon brush holders 20, and two covering caps 30.

The shell body 10 is made of plastics, bakelite, or any suitable electrically insulated material, comprising an annular coupling portion 11, a plurality of radial supporting portions 12 inwardly backwardly extended from the inside wall of the annular coupling portion 11 and connected to one another, two receiving holes 13 transversely and coaxially extended through a pair of inner and outer projections 2,4 integrally and coaxially formed on opposite sides of the annular coupling portion 11, two symmetrical pairs of locating grooves 132 respectively formed on the outer projection 4 of the annular coupling portion 11 adjacent to top and bottom sides of the receiving holes 13, and two positioning grooving portions 131 respectively provided in the receiving holes 13.

The carbon brush holders 20 each comprise a mounting plate 21 and a spiral spring 22. The mounting plate 21 is a metal strip comprising a hook portion 211 curved downwards from the front end thereof, an upright 212 perpendicularly upwardly extended from the rear end thereof, and a locating hole 213 disposed near the front end. The spiral spring 22 is a spirally arranged spring plate rested on the mounting plate 21 and stopped at the upright 212, having a front hook 221 inserted into the locating hole 213 of the mounting plate 21. The spiral spring 22 and the mounting plate 21 are inserted into one receiving hole 13 of the shell body 10, and then the hook portion 211 of the mounting plate 21 is hooked on the free end of the inner projection 2 of the annular coupling portion 11, keeping the mounting plate 21 set in the positioning grooving portion 131 of the respective receiving hole 13.

The two covering caps 30 are made of electrically insulated material, for example, plastics, each comprising two coupling flanges 31 corresponding to the locating grooves 132 on outer projection 4. By means of forcing the coupling flanges 31 into engagement with the locating grooves 132, the covering caps 30 are secured to the outer projection 4 to close the receiving holes 13. After mounting of the carbon brush holders 20 in the receiving holes 13 of projection 2 and 4, the covering caps 30 are respectively fastened to the locating grooves 132 of the shell body 10 with the coupling flanges 31 to close the receiving holes 13.

When in use, two carbon brush bars 40 are respectively inserted into the receiving holes 13 from the inside of the shell body 10 toward the outside and stopped against the spiral spring 22, and then the back cover 100 is fastened to the motor's housing (not shown), keeping the carbon brush bars 40 pressed on the commutator 50 by the spring force of the respective spiral springs 22. This installation procedure is quite simple. Further, when wishing to replace the carbon brush bars 40 after a long use, the shell body 10 is removed from the commutator 50, and then the carbon brush bars 40 are directly removed from the receiving holes 13 for a replacement. This maintenance work is also simple.

What is claimed is:

1. A back cover for engagement to a housing for a commutator, comprising:

an annular shell body having an inner and outer wall;

a pair of first projections respectively formed integrally as a unit with opposite sides of the outer wall;

a pair of second projections respectively formed integrally as a unit with opposite sides of the inner wall;

each pair of first projections and second projections respectively having a coaxial receiving hole therethrough and through said body;

a carbon brush holder for holding a carbon brush bar having a mounting plate engaged in each said receiving hole;

a first end of said mounting plate fixed to a free end of each of said second projections;

a spring engaged to said mounting plate and located at a second end of said mounting plate to force the brush bar against the cummulator extending into the back cover from the motor housing; and a cover cap engaged to a free end of each of said first projections covering a corresponding receiving hole.

2. The back cover for a motor as claimed claim 1, wherein said shell body is electrically insulated.

3. The back cover for a motor as claimed in claim 1, wherein said cover caps are engaged to an annular coupling portion formed as a unit with said shell body, and a plurality of radial supporting portions inwardly backwardly extended from said annular coupling portion and connected to one another.

4. The back cover for a motor as claimed in claim 3, wherein said receiving holes are formed in said annular coupling portion at two opposite sides.

5. The back cover for a motor as claimed in claim 1, wherein said shell body further comprises two symmetrical pairs of locating grooves respectively located on the first projections adjacent to said receiving holes; said cover caps each comprise two coupling flanges respectively engaged onto said locating grooves of said shell body.

6. The back cover for a motor as claimed in claim 1, wherein each of the receiving holes has a locating grooving portion in which the mounting plate of said carbon brush holder is positioned.

7. The back cover for a motor as claimed in claim 1, wherein the first end of the mounting plate of each said carbon brush holder comprises a hook portion respectively hooked on the free end of the second projections.

8. The back cover for a motor as claimed in claim 1, wherein the mounting plate of each said carbon brush holder has a locating hole at the second end thereof; the spring of each said carbon brush holder is a spiral spring having a front hook inserted into the locating hole of the mounting plate of the respective carbon brush holder.

9. The back cover for a motor as claimed in claim 1, wherein said cover cap is electrically insulated.

10. The back cover for a motor as claimed in claim 1, wherein the mounting plate and the spring of each said carbon brush holder are respectively made of metal material.

11. The back cover according to claim 1, wherein said receiving holes are coaxial.

* * * * *